Nov. 1, 1960 S. J. BEGUN 2,958,849

MULTICHANNEL MAGNETIC REPRODUCING APPARATUS

Filed Oct. 29, 1954 5 Sheets-Sheet 1

INVENTOR.
SEMI JOSEPH BEGUN
BY
William J. Flynn
ATTORNEY

INVENTOR.
SEMI JOSEPH BEGUN
BY
William J. Flynn
ATTORNEY

Nov. 1, 1960 S. J. BEGUN 2,958,849

MULTICHANNEL MAGNETIC REPRODUCING APPARATUS

Filed Oct. 29, 1954 5 Sheets-Sheet 3

INVENTOR.
SEMI JOSEPH BEGUN
BY
William J. Flynn
ATTORNEY

*INVENTOR.*
SEMI JOSEPH BEGUN
*BY*
*William J. Flynn*
ATTORNEY

MULTICHANNEL MAGNETIC REPRODUCING APPARATUS

Filed Oct. 29, 1954

INVENTOR.
SEMI JOSEPH BEGUN
BY
William J. Flynn
ATTORNEY 2,958,849
Patented Nov. 1, 1960

2,958,849

MULTICHANNEL MAGNETIC REPRODUCING APPARATUS

Semi Joseph Begun, Cleveland Heights, Ohio, assignor to Clevite Corporation, Cleveland, Ohio, a corporation of Ohio Filed Oct. 29, 1954, Ser. No. 465,709

19 Claims. (Cl. 340—172.5)

This invention relates to magnetic reproducing apparatus having provision for selectively adjusting during playback the time relationship among several signals recorded simultaneously at different channels on a multichannel magnetic record, and is particularly directed to such apparatus for use in the interpretation of multichannel magnetic recordings made in the course of geophysical prospecting.

In geophysical prospecting for oil or other mineral deposits an extensively used technique involves firing an explosive shot in the ground and making simultaneous recordings of the seismic reflections picked up by several geophones spaced in a predetermined pattern away from the shot point. One type of equipment for this general purpose uses multichannel magnetic recording of the seismic reflections. From the multichannel magnetic recording a visual reproduction is made, and from the interpretation of this visual reproduction the likelihood of oil in that vicinity is determined. In playing back the several magnetically recorded signals to make the visual record the operator makes selective adjustments of the time relationship among the signals on the different channels of the multichannel magnetic record to aid in the interpretation of the recorded information. For example, it may be necessary to alter the time relationship among the several signals in order to correct for phase differences resulting from the differences in position of the respective geophones during the recording interval. In the past, the selective altering of the time relationship among the signal channels on a multichannel magnetic record has presented practical difficulties in the design and operation of multichannel magnetic playback and re-recording equipment for this purpose.

The present invention is directed to novel apparatus which facilitates such adjustment of the signal time relationship in reproducing the signals which have been recorded simultaneously at the respective channels on a multichannel magnetic record.

Accordingly, it is an object of the present invention to provide multichannel magnetic reproducing and re-recording apparatus having novel and simplified provision for selectively altering during playback the time relationship among the signals which have been recorded simultaneously on the different channels of a multichannel magnetic record.

Also, it is an object of this invention to provide such an arrangement for adjusting the time relationship among the several signals which is compact in size and which is of economical design.

Other and further objects of the present invention will be apparent from the following description of several preferred embodiments thereof illustrated in the accompanying drawings and described in detail in the following description.

Figure 1:
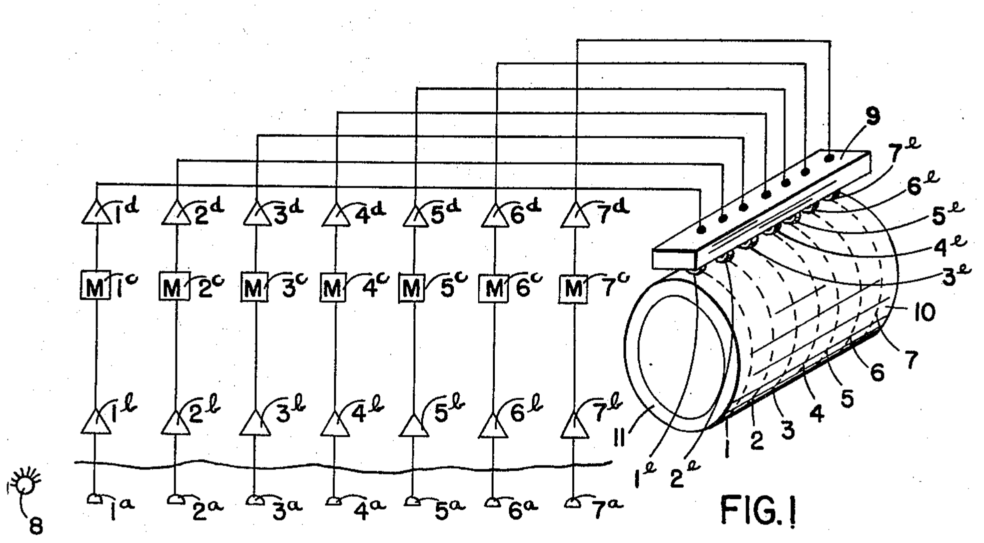
Figure 1 is a schematic view illustrating the recording simultaneously on the respective channels of a multichannel magnetic record of seismic reflections picked up by individual geophones following the firing of an explosive in the ground.

Referring to Fig. 1, in accordance with a well-known technique used in geophysical prospecting there may be made a multichannel magnetic recording of the seismic reflections caused by the firing of an explosive shot in the ground. During the recording interval, the seismic reflections picked up by the geophones, or seismometers, *1a*, *2a*, *3a*, *4a*, *5a*, *6a* and *7a*, which are spaced in a predetermined pattern away from the explosive shot point 8, are supplied as electrical signals to the respective amplifiers *1b*—*7b*. After amplification the seismic signals are used to frequency modulate corresponding higher frequency carrier signals in the multivibrator-type modulators *1c*—*7c*, respectively, and the frequency modulated carrier outputs from these modulators are supplied through amplifiers *1d*—*7d*, respectively, to the respective magnetic recording heads *1e*, *2e*, *3e*, *4e*, *5e*, *6e* and *7e*, respectively.

The magnetic heads *1e*—*7e*, are mounted in a common housing 9 to provide an integral multichannel magnetic head unit which has the recording gaps of the individual heads extending in precise alignment transversely across the original multichannel magnetic record tape 10. The original record tape 10 is mounted on a rotary drum 11 which during the recording interval rotates at constant speed to move the respective parallel information channels 1—7 on the record tape past the recording gaps of the overlying magnetic heads.

In actual practice in geophysical prospecting more than seven information signals will be recorded, generally. Therefore, it is to be understood that the illustrated showing of a seven-channel record is merely for the purpose of simplifying the description to facilitate an understanding of the principles of the present invention. For example, as many as 48 signal channels may be provided on the multichannel record tape, in which case all of the magnetic recording heads would be mounted in a common housing to provide a multichannel magnetic head unit having the respective recording gaps of the individual heads in the unit extending in alignment transversely across the record tape, as in the seven-channel embodiment illustrated herein.

After the original recording of the seismic reflection signals, the record tape may be removed from the drum 11 and taken to the location where the analysis and interpretation of the recording is to be made. For such analysis and interpretation of the recording, a presently used technique involves the selective alteration of the time relationship among the different signal channels for the purpose of emphasizing the more significant components of the recorded signals and minimizing the spurious and non-essential signal components. However, in one practical embodiment the spacing between adjacent edges of adjacent signal channels on the magnetic record tape would be only about .053 inch, and a 48-channel record tape would be only about 3¾ inches wide. Obviously, because of the close spacing of the respective signal channels on the multichannel record tape it would be quite difficult and impracticable to mount the several magnetic playback heads for the respective signal channels for adjustment individually, in order to alter the time relationship among the respective signals as they are played back. In accordance with the present invention there is provision for transferring the recorded signals from the multichannel record tape on which they were recorded simultaneously onto a second record in a selectively different time relationship, but which does not require that the heads for the different channels be individually adjustable.

Figures 2, 3:
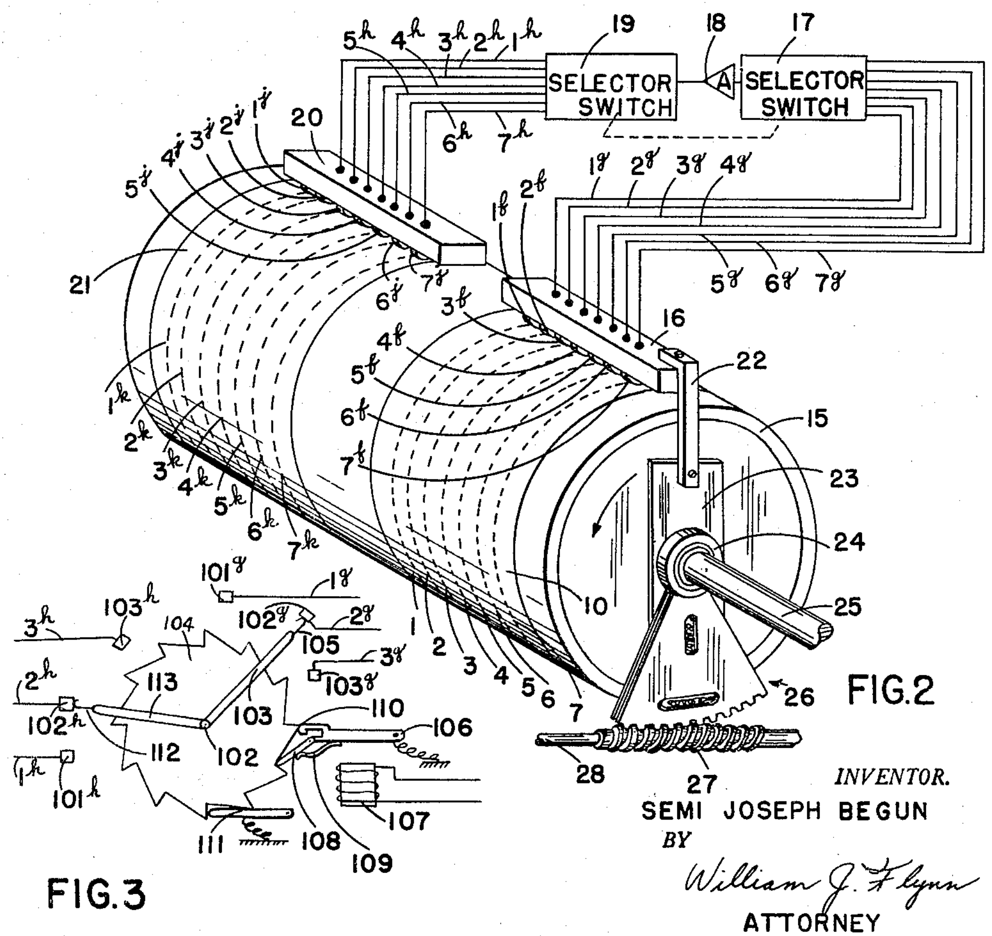
Figure 2 is a schematic isometric view showing a first form of magnetic reproducing and re-recording apparatus in accordance with the present invention for re-recording the geophone signals onto a multichannel magnetic transfer record with a selectively different phase relationship among the signals than as originally recorded.
Figure 3 illustrates a conventional step-type selector switch arrangement used in the Fig. 2 apparatus.
Figure 4:
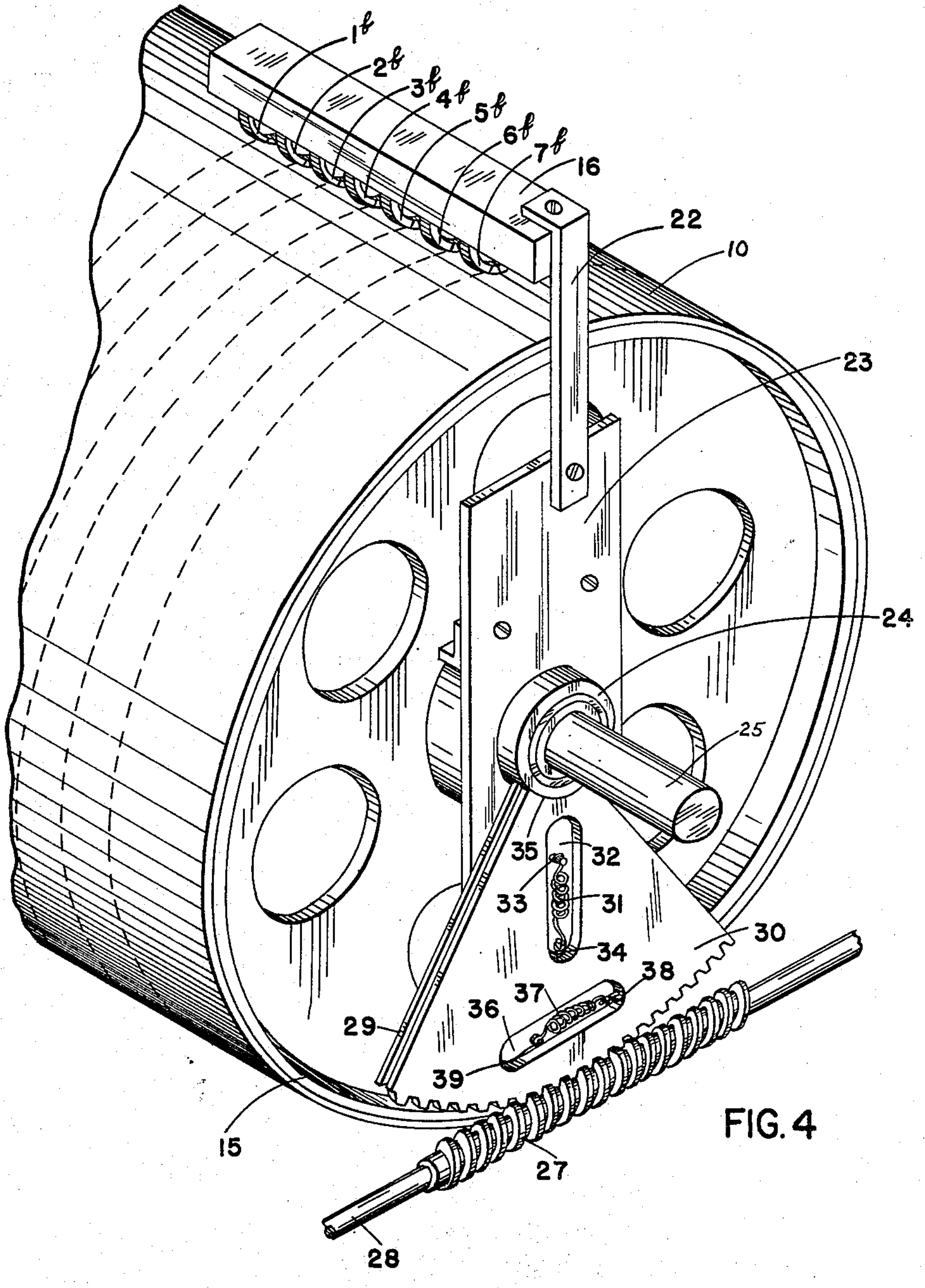
Figure 4 is a fragmentary isometric view showing the adjustable mounting for the multichannel magnetic playback head unit in the Fig. 2 apparatus.

*Apparatus of Figs. 2–4*

To this end, in accordance with a first embodiment of this invention, there is provided the re-recording unit shown generally in Fig. 2. This unit includes a rotary drum 15 having a cylindrical periphery on which the original multichannel magnetic record tape 10 may be mounted. Overlying the original record tape 10 is an integral multichannel magnetic playback head unit identical to the multichannel recording head unit of Fig. 1. This head unit includes a housing 16 which carries a plurality of individual magnetic heads 1*f*, 2*f*, 3*f*, 4*f*, 5*f*, 6*f* and 7*f*, which have their respective playback gaps in precise alignment transversely across the original record tape 10, overlying the respective signal channels 1—7 on the record tape 10. An advantageous feature of this invention is that the distance around the periphery of the drum is longer than the original record tape 10, so that during each rotation of the drum there is an interval of "dead time" during which no portion of this record tape is passing under the playback head unit. The playback heads 1*f*—7*f*, are connected to lines 1*g*—7*g*, respectively, which lead to a step-type selector switch 17 of known design. The selector switch 17 is arranged to connect each of the lines 1*g*—7*g* individually in succession to the amplifier 18 connected to the output of the selector switch. The output from the amplifier 18 is supplied to a similar selector switch 19 which has its several output terminals connected to lines 1*h*, 2*h*, 3*h*, 4*h*, 5*h*, 6*h* and 7*h*. The selector switch 19 operates in unison with the selector switch 17 such that when the selector switch 17 connects the line 1*g* to the input of amplifier 18, the amplifier output is connected to line 1*h*, and so on. The lines 1*h*—7*h* are connected respectively to the individual magnetic recording heads 1*j*—7*j* mounted in a common housing 20 to have their respective recording gaps in precise alignment. These magnetic heads overlie the individual channels 1*k*—7*k* on a transfer multichannel magnetic record tape 21 mounted on the periphery of drum 15.

Both of the selector switches 17, 19 may be incorporated in a multiple unit of a type common in the telephony art. Fig. 3 illustrates schematically one such switch. The several fixed contacts 101*g*, 102*g*, 103*g*, etc. of the selector switch 17 are connected to the lines 1*g*, 2*g*, 3*g*, etc. and are positioned sequentially in circumferentially spaced relation about a shaft 102 on which are mounted a mobile contact carrying arm 103 and a ratchet disk 104. A mobile contact 105 carried by arm 103 is suitably connected electrically to the input of amplifier 18 and is positioned to engage each of the fixed contacts 101*g*, 102*g*, 103*g*, etc., individually in succession as the arm 103 is advanced clockwise about axis 102. A series of fixed contacts 101*h*, 102*h*, 103*h*, etc. connected respectively to the lines 1*h*, 2*h*, 3*h*, etc. are positioned circumferentially to be engaged in succession individually by a mobile contact 112 carried by an arm 113 secured to shaft 102. Mobile contact 112 is electrically connected to the output of amplifier 18 in Fig. 2. An electromagnet-operated pawl mechanism actuates the ratchet 104 intermittently to accomplish the simultaneous step-by-step advance of the mobile contact arms 105 and 112. This pawl mechanism includes a pivotally mounted, spring-biased lever 106 which is attracted counterclockwise in Fig. 3 when electromagnet 107 is energized. At its outer end the lever 106 pivotally supports a pawl finger 108. A spring 109 biases the pawl finger 108 into engagement with the teeth on the periphery of ratchet 104. A stop 110 carried by lever 106 prevents the pawl finger 108 from pivoting clockwise in Fig. 3.

In the operation of this ratchet and pawl mechanism, each time the electromagnet 107 is energized, which occurs at a predetermined instant during each drum rotation, the pawl lever 106 is attracted and the pawl finger 108 moves the ratchet a distance of one tooth (clockwise in Fig. 3) to advance the mobile contacts 105 and 112 simultaneously into engagement with the next pair of fixed contacts. The spring-biased, pivoted holding pawl 111 engages the ratchet to hold it at the position to which it has been advanced. When the electromagnet 107 is de-energized the pawl lever 106 moves back (clockwise in Fig. 3) to its unactuated position. During this return movement the pivoted pawl finger 108 rides across the inclined surface of the underlying tooth on the ratchet, and in the final return position of the pawl mechanism the pawl finger 108 is received in the notch behind this tooth.

The integral multichannel re-recording head unit 20 is suitably fixedly mounted so that the positions of the respective aligned recording gaps of the heads 1*j*—7*j* overlying the transfer tape 21 do not change during the re-recording sequence. However, the housing 16 for the multichannel playback head unit overlying the original record tape 10 is mounted for adjustment along the length of record tape 10. In the mechanism shown schematically in Fig. 2 this adjustable mounting for the housing 16 includes a bracket 22 to which the housing 16 is rigidly attached. The bracket 22 is carried by a plate 23 mounted on an annular ball bearing sleeve 24, which is mounted for rotary movement about the shaft 25 which carries drum 15. The bearing sleeve 24 is suitably connected by an arrangement, described in detail hereinafter, to an anti-backlash gear assembly 26 which meshes with a worm 27 on a rotatable shaft 28.

With this arrangement, when shaft 28 is turned a predetermined amount, it drives the gear assembly 26 and plate 23 to cause the latter to turn abount shaft 25. This, in turn, causes the position of the integral multichannel playback head unit to be shifted lengthwise along the original record tape 10 on drum 15. Shaft 28 may be turned under the control of a computer, or any other control mechanism, or manually by the operator.

Referring to Fig. 4, the anti-backlash gear assembly 26 includes an inner gear sector 29, which is rigidly attached to plate 23, and an identical outer gear sector 30, which contiguously overlies the inner gear sector and which is separate from the rigid assembly of the inner gear sector 29, outer bearing sleeve 24 and plate 23. A tension coil spring 31 is located in an opening 32 in the outer gear sector 30 and has its upper end secured to an eye bolt 33 carried by the inner gear sector 29 and its lower end secured to an eye bolt 34 carried by the outer gear sector 30. Spring 31 exerts a radially inward pull on the outer gear sector 30 to maintain the arcuate inner face 35 of this gear sector tightly against the complementary cylindrical outer periphery of bearing sleeve 24, thereby positioning the toothed radially outward periphery of the outer gear sector 30 even with the toothed outer periphery of the inner gear sector 29.

The outer gear sector 30 is also formed with a transverse opening 36 at which is located a coil spring 37, which is under tension between its connection at one end to an eye bolt 38 carried by the outer gear sector 30 and its connection at the other end to a pin 39 carried by the inner gear sector 29. Spring 37 biases the outer gear sector 30 to have its gear teeth slightly offset from the gear teeth on the contiguous inner gear sector 29. This provides an effective anti-backlash gearing arrangement of known design.

In the operation of this apparatus, the signals which were recorded simultaneously on the different channels of the original multichannel record tape 10 are played back individually in succession and re-recorded at the corresponding channels on the transfer record tape 21. Thus in the first rotation of drum 15, the selector switches 17 and 19 would connect the playback head 1*f* to the re-recording head 1*j*; in the second rotation of drum 15, the selector switches 17 and 19 would connect the playback head 2*f* to the re-recording head 2*j*, and so on. In order to alter the time relationship among the signals as they are played back and re-recorded, the shaft 28 is turned to thereby move the playback head housing 16 to different positions along the original record tape 10. As pointed out above, preferably the drum 15 which supports the record tapes during the playback and re-recording cycle has a circumferential length greater than the length of each record tape 10, 22 thereon, so that in each rotation of the drum there is an interval of one second or so during which the record tapes are not passing under the respective heads. The adjustment of the position of the playback head housing 16 may take place during this interval to alter the time relationship between the signal on the succeeding channel to be played back in the next drum rotation and the signal on the channel which has just been played back. Alternatively, in some techniques of interpreting records of this type it is desired to continuously shift the phase during the playback and re-recording of each channel, in which case the illustrated apparatus is readily adapted for such operation. In one practical embodiment, the drum 15 may complete a rotation each 6 seconds, with a dead time interval of 1 second, and the surface speed of the drum is 7.5 inches per second.

In the event that each record tape has a length substantially the same as the length of the drum periphery then the playback and re-recording system should be deactivated every other drum revolution, during which time the adjustment of the position of the playback head unit may be made.

It will be noted that, even though it is capable of performing the complex operations of adjusting the time relationships among the signals on the different record channels, the foregoing apparatus is quite simple and compact, especially since it involves the use of standard integral multichannel magnetic re-recording/reproducing head units having the head gaps aligned.

In transferring the recorded signals from the original record tape 10 to the transfer record tape 21 the frequency-modulated recorded signal is not demodulated, so that essentially no deterioration of the recorded signal takes place in the transfer process.

It will be apparent that, within the purview of the present invention, the foregoing apparatus may be modified to make the playback head unit stationary and the re-recording head unit adjustable, with essentially the same mode of operation and end result.

Figure 5:
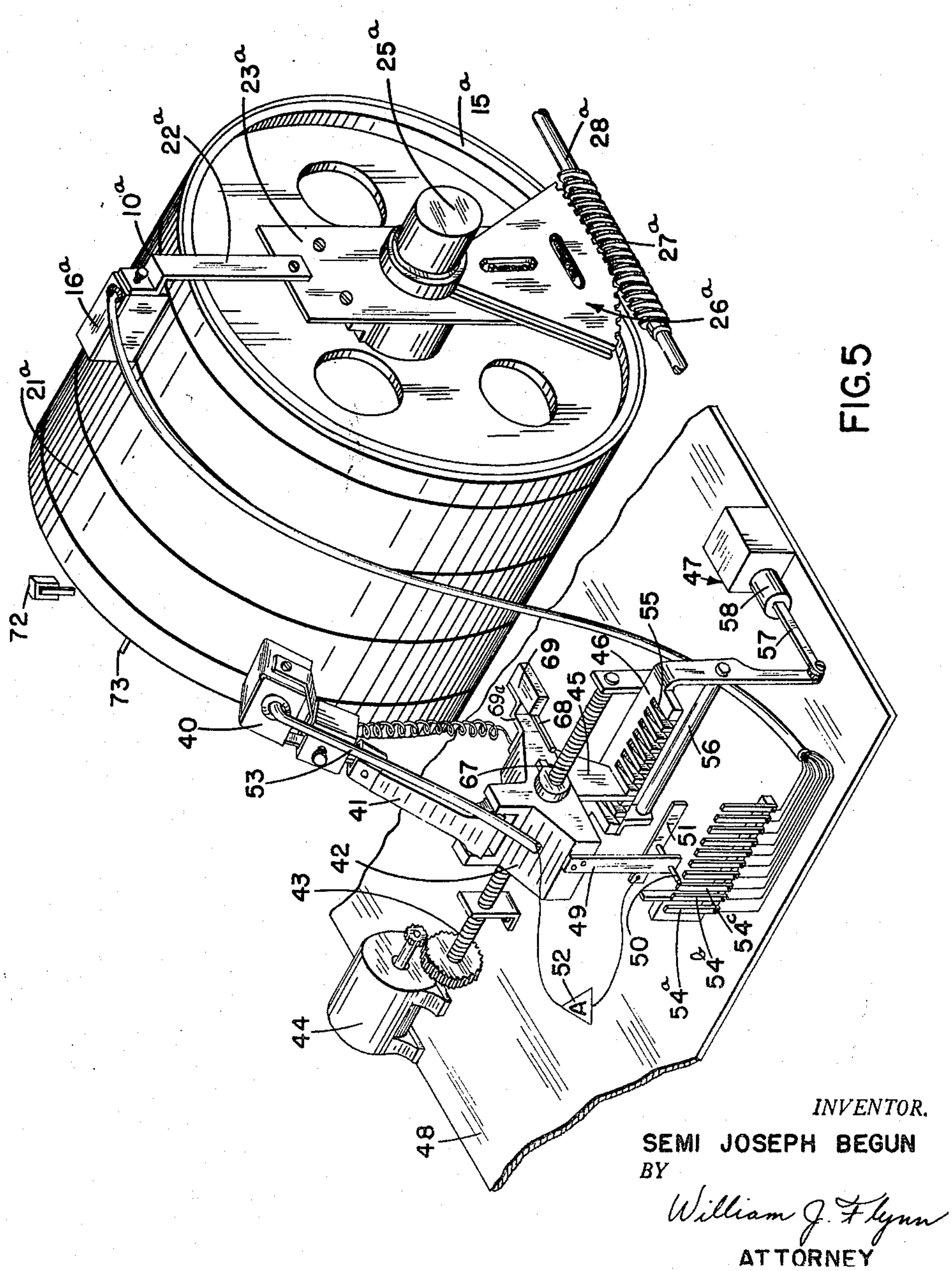
Figure 5 is an isometric view showing a second form of the reproducing and re-recording apparatus of the present invention.
Figure 6:
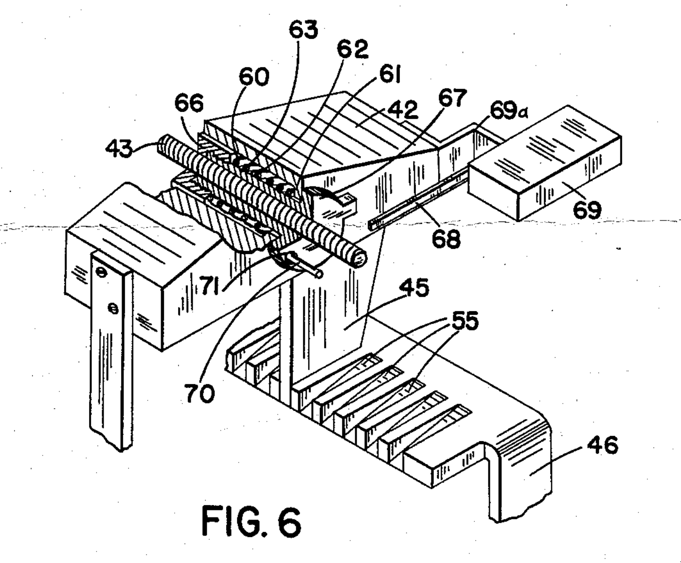
Figures 6 and 7 are fragmentary isometric views showing, in different phases of its operation, the mechanism for indexing the single channel re-recording head unit in the Fig. 5 apparatus.
Figure 7:
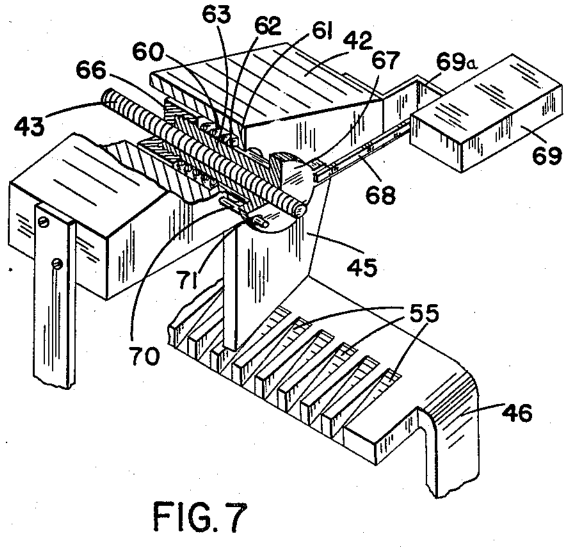

*Apparatus of Figs. 5–7*

A second embodiment of the present invention is shown in Fig. 5. This apparatus employs a single channel re-recording head mounted to be indexed from one channel to the next across the transfer record tape after each drum rotation.

Referring to Fig. 5, the original multichannel magnetic record tape 10*a*, on which the geophone signals have been recorded simultaneously on the different channels, is mounted on the cylindrical periphery of a rotary drum 15*a* mounted on a rotary shaft 25*a*. An integral multichannel magnetic playback head unit 16*a* overlies the original record tape 10*a*, with the playback gaps of the individual heads in this unit extending in precise alignment transversely across the record tape. The head unit 16*a* is mounted on a bracket 22*a* carried by a plate 23*a* mounted to be turned about the drum shaft 25*a*. Such turning is effected through a rotary shaft 28*a*, worm 27*a* thereon and anti-backlash gear assembly 26*a* identical to that described in detail above in the discussion on the first embodiment of this invention. The multichannel playback head unit 16*a* may be shifted selectively along the length of the original record tape 10*a* by this mechanism.

The multichannel magnetic record transfer tape 21*a* on which the signals are to be re-recorded in altered time relationship is mounted on the periphery of drum 15*a* in axially spaced relation from the original record tape 10*a*. A single channel magnetic recording head unit 40 is mounted to overlie the transfer record tape 21*a* and its mounting includes provision for shifting head 40 from one channel to the next across the transfer tape 21*a*.

To this end, the head 40 is supported by an arm 41 pivoted on a carriage 42, which is threadedly mounted on a rotary screw 43. Screw 43 is driven through reduction gearing from an indexing motor 44 of the permanent magnet type. The carriage 42 carries a depending finger 45 adapted to be locked in place by a slotted locking member 46 controlled by a solenoid 47 mounted on the stationary platform 48 which supports the indexing motor. The carriage 42 also carries a depending arm 49 which supports a movable switch contact 50. At its back side the movable switch contact 50 is continuously in engagement with an elongated contact terminal 51, which is connected through an amplifier 52 to the line 53 leading to the coil of the magnetic head 40. At its front side, the movable switch contact 50 is positioned to engage individually in succession the separate fixed terminals 54*a*, 54*b*, 54*c*, etc., which are connected to the individual magnetic heads in the integral multichannel playback head unit 16*a*.

The locking member 46, which is provided with slots 55 in its upper face adapted to receive the depending arm 45 on carriage 42, is pivotally mounted on a fixed rod 56 and at its lower end has a pivotal connection to an extension rod 57 connected rigidly to the reciprocatory armature 58 of solenoid 47. Normally the solenoid armature 58 is spring biased to the right in Fig. 5, tending to pivot the locking member 46 counterclockwise in Fig. 5 to position its slotted upper face in engagement with the finger 45 depending from the carriage 42. When solenoid 47 is energized, it moves the armature 58 to the left in Fig. 5, pivoting the locking member 46 clockwise to release it from engagement with finger 45. Such energization of the solenoid takes place briefly once each revolution of the drum when the switch 72, which controls the energization of the solenoid, is actuated by the pin 73 projecting from the drum.

Referring now to Figs. 6 and 7, the carriage 42 is formed with a passage 60 presenting an annular inturned shoulder 61 at its right and against which one end of a helical spring 62 bears. This spring loosely encircles a hub 63, which is loosely received in the passage 60 and which is threadedly mounted on screw 43 driven by the indexing motor 44 through the reduction gearing. A nut 66, which is loosely received in the passage 60, is threaded onto the left end of hub 63 and engages the opposite end of coil spring 62. At its right end the hub 63 is formed with an enlarged head 67 disposed to the right of the carriage 42 and adapted to engage the operator 68 of a normally closed limit switch 69. Switch 69 is carried by a bracket 69*a* mounted on carriage 42 and is connected to control the energization of the indexing motor 44. A pin 70 projects from the right end of carriage 42 into a hole 71 in the hub head 67 to insure that the hub does not rotate in unison with shaft 64.

In the operation of this mechanism, assuming that initially the pen motor carriage 42 is locked against movement by virtue of the reception of its depending finger 45 in one of the slots 55 in the locking member 46, as shown in Fig. 6, at this time the indexing motor 44 is energized and drives screw 43 in a direction to advance the unitary assembly of hub 63 and nut 66 to the right in Figs. 5–7. Such movement of nut 66 compresses the coil spring 62, whose other end bears against the now-stationary carriage 42. After the screw 43 has advanced the hub 63 to the right a distance corresponding to the spacing between two adjacent slots 55 on the locking member 46, the enlarged head 67 on the hub engages the operator 68 of limit switch 69, de-energizing the indexing motor 44 temporarily. When the indexing motor is thus de-energized, screw 43 ceases to turn, hub 63 is stationary with its enlarged head 67 engaging the switch operator 68 to maintain switch 69 open, and the coil spring 62 is compressed tightly. This condition is shown in Fig. 7. When the solenoid 47 is energized momentarily at a pre-determined time during each rotation of drum 15*a*, as described, it moves the locking member 46 to disengage from the depending carriage finger 45. Accordingly, the carriage 42 is free to move to the right under the influence of the compressed spring 62. The movement of carriage 42 to the right is limited by the position of the hub head 67 on the now-stationary screw 43, and the parts are so proportioned that such movement of the carriage 42 is through a distance exactly equal to the spacing between adjacent slots 55 on the locking member 46. After having been shifted to the right in this manner, the carriage 42 has its depending finger 45 positioned to engage in the next slot 55 in the locking member 46 when the locking member returns to its normal position when solenoid 47 is no longer energized. In this new position of the carriage 42, the limit switch 69 has also been displaced to the right so that its operator 68 is no longer engaged by the enlarged head 67 on hub 63. Therefore, switch 69 is in its normal closed position and the indexing motor 44 is again energized. Motor 44 drives screw 43 to advance the hub 63 again to the right compressing spring 62 until it again opens switch 69 to de-energize the indexing motor. Then, when the solenoid 47 is again energized (at a predetermined time during the next drum rotation) the pen motor carriage is again indexed one notch to the right.

Thus, on successive rotations of drum 15*a*, the carriage 42 and the single channel magnetic head unit 40 carried thereby are indexed successively to the right so that the head unit 40 overlies successive channels on the transfer record tape 21 upon successive drum rotations. Also, the mobile switch contact 50 supported by the carriage 42 engages successive contacts 54*a*, 54*b*, 54*c*, etc. connected respectively to the individual heads in the playback head unit 16*a*, so that the individual signals at the successive channels on the original record tape 10*a* are played back and re-recorded on the transfer record tape 21*a*, upon successive drum rotations, in the time relationship determined by the position of the playback head unit 16*a*. In order to return the re-recording head 40 to its original position overlying the first channel on the transfer record tape 21*a*, the motor 44 is reversed and the resultant reverse rotation of screw 43 returns the carriage 42, which supports the re-recording head, to the left in Fig. 5.

It is to be understood that this second embodiment may be modified to provide the single channel head overlying the original record tape 10*a*, and adjustable from one channel to the next across that tape, and the multichannel head unit overlying the transfer record tape 21*a*. Also, in either case the single channel head unit could be mounted for adjustment around the drum periphery and the multichannel head unit mounted to remain fixed with respect to the drum. Any such modifications would be obvious equivalents of the particular arrangement shown in Figs. 5–7 and would fall within the spirit and scope of the present invention.

Figure 8:
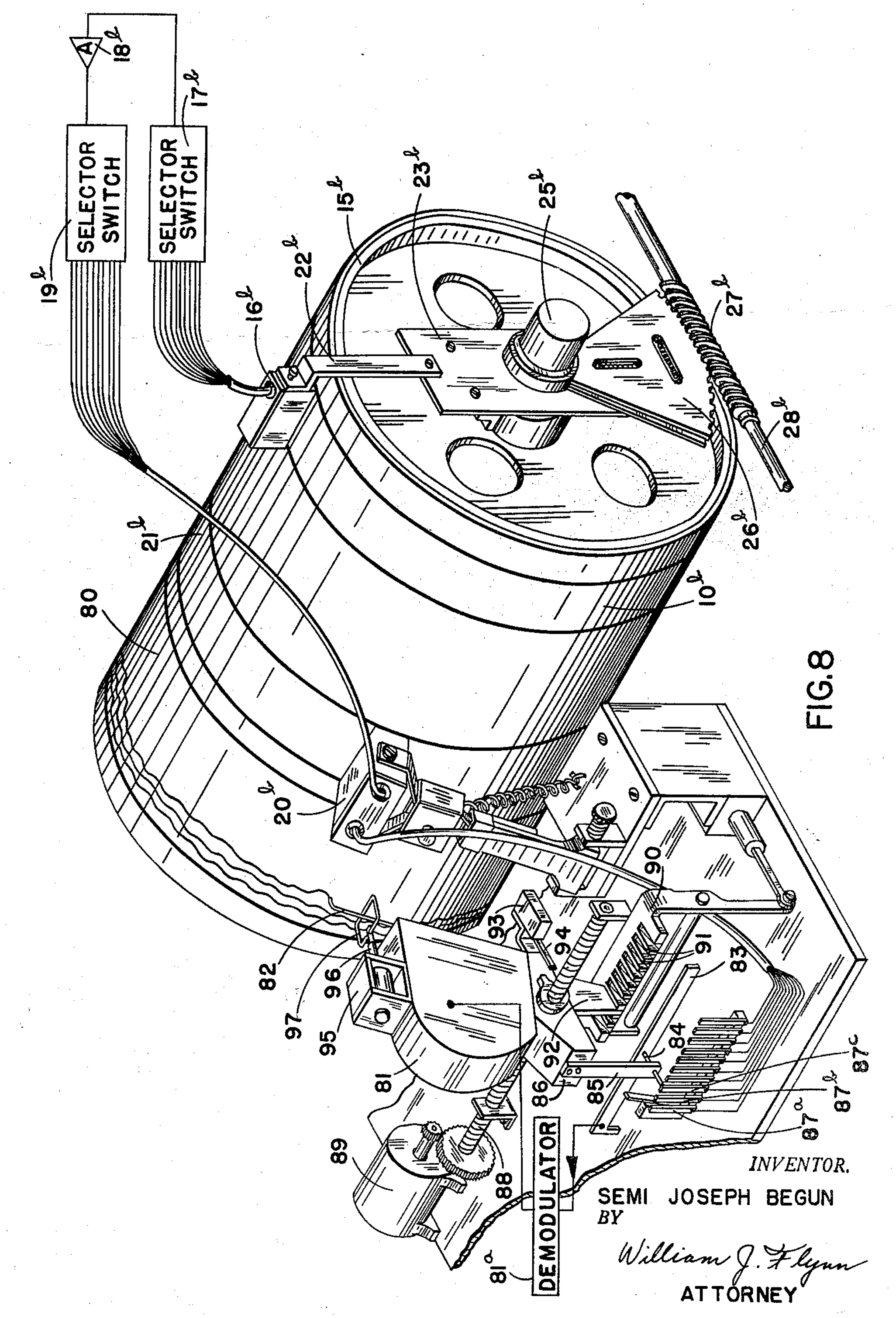
Figure 8 is an isometric view of a third form of the present invention having provision for making a visual record of the signals following their magnetic re-recording in different phase.

*Apparatus of Fig. 8*

Fig. 8 illustrates a third embodiment of the present invention which has provision for recording the signals individually as visual traces on a visual record following the magnetic re-recording of the signals in altered phase relation. In this embodiment, during each rotation of the drum following the first such rotation the signal which has just been re-recorded on the transfer tape in altered phase in the previous drum rotation is reproduced in the form of a visual trace on the visual record. Thus, only one additional drum rotation following the magnetic playback and re-recording sequence is necessary to complete the multichannel visual record.

Referring to Fig. 8, the rotary drum 15*b* is mounted on a rotary shaft 25*b*. The original multichannel magnetic record tape 10*b*, on which the geophone signals were recorded simultaneously on separate channels, is mounted on the cylindrical periphery of the drum. An integral multichannel magnetic playback head unit 16*b* overlies the original record tape 10*b* and provides individual magnetic playback heads having their playback gaps extending in precise alignment transversely across the record tape 10*b*, with each of these individual heads overlying a respective signal channel on the record tape 10*b* to reproduce the signal thereon as the drum 15*b* rotates to move the record tape 10*b* past the playback head unit 16*b*.

The playback head unit 16*b* is mounted for adjustment lengthwise along the original record tape 10*b* by an arrangement identical to that in the first embodiment of the present invention, described in detail hereinbefore. This arrangement includes a bracket 22*b* carrying the head unit 16*b* and rigidly connected to a plate 23*b*, which is connected to an anti-backlash gearing arrangement 26*b* driven by a screw 27*b* on rotary shaft 28*b*. Through this arrangement, rotation of shaft 28*b* causes the playback head unit 16*b* to be shifted lengthwise along the original record tape 10*b*.

The individual heads in the playback head unit 16*b* are connected through individual lines to the step-type selector switch 17*b*. The single output terminal of this switch is connected through an amplifier 18*b* to the single input terminal of the step-type selector switch 19*b*. A plurality of lines connected to the separate output terminals of selector switch 19*b* lead to the individual heads in the integral multichannel magnetic re-recording and playback head unit 20*b*, which overlies the multichannel magnetic record transfer tape 21*b* mounted on the periphery of drum 15*b*. The selector switch arrangement may be a type similar to that shown in Fig. 3. The multichannel magnetic re-recording and playback head unit 20*b* presents a plurality of individual recording and playback heads which have their recording gaps extending in precise alignment transversely across the transfer record tape 21*b* and which respectively overlie individual channels on this record tape.

The selector switches 17*b* and 19*b* are suitably arranged to operate in unison, such that when switch 17*b* connects the "channel one" head in the playback head unit 16*b* to the amplifier 18*b* the other switch 19*b* connects the "channel one" head in the re-recording head unit 20*b* to the output of this amplifier. Then, the selector switches 17*b* and 19*b* connect the "channel two" head in the playback head unit 16*b* to the "channel two" head in the re-recording head unit 20*b*, and so on, with each individual head in the playback head unit 16*b* connected to the corresponding head in the re-recording head unit upon successive rotations of drum 15*b*.

Thus far, the mechanism and operation of the Fig. 8 embodiment is the same as in the first-described embodiment shown in Figs. 2–4.

In addition, the Fig. 8 drum carries a visual record in the form of a paper chart 80 on which the re-recorded signals may be reproduced individually in the form of visible traces. To this end there may be provided a magnetic pen motor, indicated generally at 81, which operates a pen stylus 82 overlying the paper chart 80. The magnetic pen motor may be of the type shown in United States Letters Patent No. 2,478,329, to H. Shaper. The coil of the pen motor is connected electrically to the output of a frequency demodulator 81*a* which has its input connected to an elongated stationary contact bar 83 which is continuously engaged by a movable contact 84 carried by an arm 85 depending from the carriage 86 which supports the pen motor 81. The opposite end of the movable contact 84 is positioned to engage in succession a series of individual fixed contact fingers 87*a*, 87*b*, 87*c*, etc., which are electrically connected individually to corresponding individual heads in the multichannel playback head unit 20*b*.

The pen motor carriage 86 is threadedly mounted on a rotary screw 88 driven through a reduction gearing from an indexing motor 89. A pivoted locking bar 90 is provided with a series of notches 91 in its upper face for receiving a finger 92 which depends from the pen motor carriage 86.

Mechanism identical to that shown in Figs. 6 and 7 and described in detail above is provided for indexing the pen motor carriage one notch to the right upon each successive rotation of the drum. A normally closed switch 93 in the energization circuit for motor 89 is mounted on carriage 86 and is provided with an actuator 94, which is depressed to open the switch and deenergize motor 89 after each advance of the pen motor carriage one notch to the right.

The pen motor housing supports a solenoid 95 provided with a reciprocatory armature 96 which carries at its outer end a yoke 97 loosely surrounding the pen stylus 82. Normally, the stylus 82 engages the record chart 80 on the drum. When the break in the record chart is about to pass under the pen stylus, at a predetermined time during each drum rotation, the solenoid 95 is energized to retract its armature 96 and lift the pen stylus off the record chart for a brief interval.

In the operation of this mechanism, during the first drum rotation, while the signal at "channel one" of the original magnetic record tape is being re-recorded onto "channel one" of the transfer tape 20*b*, no signal is supplied to the pen motor 81 and hence no tracing is made by the pen stylus 82 on the paper chart 80. However, during the second drum rotation, while the "channel two" signal on the original record tape 10*b* is being re-recorded on "channel two" of the transfer tape 21*b* in a different time relationship with respect to the "channel one" signal than on the original record tape, the movable switch contact 84*b* engages the contact finger 87*a* connected to the "channel one" head in the multichannel re-recording head unit 20*b*, so that the "channel one" signal on the transfer tape 21*b* is played back to the pen motor 81 which actuates the pen stylus 82 to make a visual trace on "channel one" of the paper chart 80, which visual trace corresponds to the "channel one" magnetically recorded signal.

At the completion of the second drum rotation, the pen motor carriage 86 is indexed one notch to the right to position the pen stylus 82 overlying "channel two" on the paper chart 80.

Then, in the third rotation of the drum, while the "channel three" signal is being re-recorded onto the transfer tape 21*b* in altered time relationship with respect to the signals previously re-recorded, the "channel two" signal is played back from the transfer tape 21*b* and is recorded as a visual trace on "channel two" of the paper chart 80.

In each of the following drum rotations, pen motor is indexed one channel to the right and is connected to record a visual trace on the paper chart 80 representing the signal which had been re-recorded on transfer tape 21*b* in the immediately preceding rotation of the drum. Thus, the visual recording operation is only one drum rotation behind the magnetic re-recording operation in point of time, and only one additional drum rotation following the re-recording of the last channel on the magnetic records is necessary to complete the visual record.

After the last channel signal has been recorded on the visual record chart 80 the pen recorder may be returned to the first channel on the visual record chart by reversing the motor 89.

In this last-mentioned embodiment, certain modifications which are obvious in the light of the present disclosure may be resorted to without departing from the spirit of the present example. For example, the visual recorder may be of a type different from the magnetic pen recorder mentioned above.

In certain instances it may be desirable to re-record from the original multichannel magnetic record tape 10*b* onto the visual record chart 80, in which case the apparatus would be substantially as shown in Fig. 8, with the transfer magnetic tape 21*b* and its recording head 20*b* omitted. In such modified arrangement, the fixed contacts 87*a*, 87*b*, 87*c*, etc. in Fig. 8 would be connected electrically to the individual heads in the multichannel playback head unit 16*b*, so that upon successive drum revolutions the individual heads in the playback head unit would be electrically connected individually to the pen recorder.

In any of the foregoing embodiments of the present invention there may be provided suitable electrical filters in the playback circuit to filter out any signal frequency components not desired in the re-recording. In such event it would be necessary to demodulate the playback signals before filtering and, preferably, then the filtered intelligence signals would be used to frequency modulate a suitable higher frequency carrier before re-recording magnetically where such magnetic re-recording is involved.

Also, in some applications of this equipment for the interpretation of seismic signals it may be desired to multiply the signals from two different channels after they have been re-recorded magnetically in altered time relationship. In such event, the two signals, which have been re-recorded magnetically in altered time relationship, would be played back simultaneously from the transfer record tape, demodulated, and then fed into a suitable multiplying device. The output from the multiplier would then be supplied to the visual recorder, such as the magnetic pen recorder mentioned above.

While there have been disclosed herein several specific preferred embodiments of the present invention, it is to be understood that various modifications, omissions and refinements which depart from the disclosed embodiments may be adopted without departing from the spirit and scope of the present invention.

I claim:

1. In a multichannel magnetic reproducing apparatus, the combination of a movable record support, a multichannel magnetic original record medium on the record support extending lengthwise in the direction of movement of the record support, an integral magnetic playback head unit contiguous to the original record medium, means for moving said record support to advance said original record medium past the playback head unit repeatedly, said playback head unit being supported to reproduce the signals from the respective channels on the original record medium upon successive movements of the original record medium past said playback head unit, a multichannel magnetic transfer record medium mounted on said record support for movement in unison with said original record medium and extending lengthwise in the direction of movement of the record support, an integral magnetic re-recording head unit contiguous to the transfer record medium and supported to record onto the respective channels of the transfer record medium upon successive movements of the transfer record medium past the re-recording head unit, means for connecting the playback head unit to the re-recording head unit for re-recording the original record signals individually in succession on the respective channels of the transfer record medium upon repeated movements of said record support, and means for selectively displacing one of said magnetic head units in the direction of movement of the record support during the sequence of repeated movements of the record support to alter the time relationship among the several signals as they are re-recorded sequentially on the respective channels of the transfer record medium.

2. The apparatus of claim 1, wherein said magnetic playback head unit comprises a plurality of individual magnetic heads individually contiguous to respective individual signal channels on the original record medium and a housing supporting said individual heads with their respective playback gaps in alignment transversely across the original record medium, said magnetic re-recording head unit comprises a plurality of individual magnetic heads individually contiguous to respective signal channels on the transfer record medium and a housing supporting said last-mentioned heads with their respective recording gaps in alignment transversely across the transfer record medium, and said means for connecting the playback head unit to the re-recording head unit includes step switch means operative to connect the individual heads in the playback unit individually in succession to corresponding individual heads in the re-recording head unit upon repeated movements of the record support.

3. The apparatus of claim 2, further characterized by a multichannel visual record medium mounted on the record support for movement in unison with the original and transfer magnetic record media, a visual recorder having provision for recording a visual trace on an adjacent channel on the visual record medium, means for indexing said visual recorder from one channel to the next across the visual record medium upon repeated movements of the record support, and means operative upon the repeated movements of the record support to connect said visual recorder to the individual head in said re-recording head unit which has recorded on the transfer record medium in a previous movement of the record support so as to record as a visual trace on the visual record medium the signal which has been re-recorded magnetically on the transfer record medium in said previous movement of the record support.

4. The apparatus of claim 1, wherein one of said magnetic head units comprises a plurality of magnetic heads individually contiguous to respective channels on the corresponding magnetic record medium and a housing supporting said magnetic heads with their respective gaps in alignment transversely across said record medium, the other of said magnetic head units comprises a single channel magnetic head contiguous to the corresponding magnetic record medium, and wherein there is provided means for indexing said single channel head from one channel to the next across the corresponding magnetic record medium upon successive rotations of the drum, and said means for connecting the playback head unit to the re-recording head unit includes switch means connecting said single channel head in succession to individual ones of said plurality of magnetic heads upon repeated movements of the record support.

5. In a multichannel magnetic reproducing apparatus, the combination of a rotary drum having a cylindrical periphery, a multichannel magnetic original record tape on the drum extending lengthwise along the cylindrical periphery of the drum, an integral magnetic playback head unit contiguous to the original record tape on the drum and supported to reproduce the signals from the respective channels on the original record tape upon successive rotations of the drum past the playback head unit, a multichannel magnetic transfer record tape on the drum extending lengthwise along the cylindrical periphery of the drum, an integral magnetic re-recording head unit contiguous to the transfer record tape on the drum and supported to re-record on the respective channels on the transfer record tape upon successive rotations of the drum past the re-recording head unit, means for electrically connecting the playback head unit to the re-recording head unit for re-recording the original record signals individually in succession on the respective individual channels of the transfer record tape upon successive rotations of the drum, and means for selectively displacing one of said magnetic head units along the drum periphery during the sequence of drum rotations to alter the time relationship among the several signals as they are re-recorded individually in succession on the respective individual channels of the transfer record tape.

6. The apparatus of claim 5, wherein said magnetic playback head unit comprises a plurality of magnetic heads individually contiguous to respective individual signal channels on the original record tape and a housing supporting said magnetic heads with their respective playback gaps in alignment transversely across the original record tape, said magnetic re-recording head unit comprises a plurality of magnetic heads individually contiguous to respective individual channels on the transfer record tape and a housing supporting said last-mentioned heads with their respective recording gaps in alignment transversely across the transfer record tape, and said means for connecting the playback head unit to the re-recording head unit includes step switch means operative to connect the magnetic heads in the playback head unit individually in succession to corresponding individual magnetic heads in the re-recording head unit upon successive drum rotations.

7. The apparatus of claim 6, further characterized by a multichannel visual record medium mounted on the drum for movement in unison with the original and transfer record tapes and extending lengthwise along the cylindrical periphery of the drum, a visual recorder having provision for recording a visual trace on an adjacent channel on the visual record medium, means for indexing said visual recorder from one channel to the next across the visual record medium upon successive drum rotations, and means operative upon the successive drum rotations to connect said visual recorder to the individual head in said re-recording head unit which has recorded on the transfer tape in the last previous drum rotation so as to record as a visual trace on the visual record medium the signal which has been re-recorded magnetically on the transfer tape in the last previous drum rotation.

8. The apparatus of claim 5, wherein one of said magnetic head units comprises a plurality of magnetic heads individually contiguous to respective channels on the corresponding record tape and a housing supporting said magnetic heads with their respective gaps in alignment transversely across the record tape, the other of said magnetic head units comprises a single channel magnetic head contiguous to the corresponding record tape and mounted to be indexed from one channel to the next across the corresponding record tape upon successive rotations of the drum, and said means for connecting the playback head unit to the re-recording head unit includes switch means connecting said single channel head in succession to individual ones of said plurality of magnetic heads upon successive rotations of the drum.

9. In a multichannel magnetic reproducing apparatus, the combination of a rotary drum having a cylindrical periphery, a multichannel magnetic original record tape extending lengthwise along the periphery of the drum, an integral multichannel playback head unit including a plurality of magnetic heads contiguous to the respective signal channels on the original record tape and a housing supporting said heads with their respective playback gaps in alignment transversely across the original record tape, a multichannel magnetic transfer record tape extending lengthwise along the periphery of the drum in spaced relation from the original record tape, an integral multichannel re-recording head unit including a plurality of magnetic heads contiguous to the respective channels on the transfer record tape and a housing supporting said last-mentioned heads with their respective recording gaps in alignment transversely across the transfer record tape, means for connecting the heads of the playback head unit individually in succession to corresponding heads of the re-recording unit upon successive rotations of the drum to re-record the original record signals individually in succession on the respective channels of the transfer record tape, and means for selectively displacing one of said head units along the drum periphery during the sequence of successive drum rotations to alter the time relationship among the several signals as they are re-recorded individually in succession on the respective channels of the transfer record tape.

10. In a multichannel magnetic reproducing apparatus, the combination of a rotary shaft, a cylindrical drum mounted on said shaft for rotation therewith, a multichannel magnetic original record tape on the drum extending lengthwise around the periphery of the drum, an integral magnetic playback head unit contiguous to the original record tape on the drum and mounted to reproduce the signals from the respective channels on the original record tape upon successive rotations of the drum past the playback head unit, a multichannel magnetic transfer record tape on the drum extending lengthwise around the periphery of the drum, an integral magnetic re-recording head unit contiguous to the transfer record tape on the drum and mounted to re-record signals onto the respective channels on the transfer record tape upon successive rotations of the drum, means for connecting the playback head unit to the re-recording head unit for re-recording the original record signals individually in succession on the respective individual channels of the transfer record tape upon successive rotations of the drum, and a support carrying one of said magnetic head units mounted on the drum shaft for adjustment angularly about said shaft to displace said last-mentioned magnetic head unit along the drum periphery during the sequence of drum rotations to alter the time relationship among the several signals as they are re-recorded individually in succession on the respective channels of the transfer record tape.

11. The apparatus of claim 10, wherein said magnetic playback head unit comprises a plurality of magnetic heads individually contiguous to respective individual signal channels on the original record tape and a housing supporting said magnetic heads with their respective playback gaps in alignment transversely across the original record tape, said magnetic re-recording head unit comprises a plurality of magnetic heads individually contiguous to respective individual channels on the transfer record tape and a housing supporting said last-mentioned heads with their respective recording gaps in alignment transversely across the transfer record tape, and said means for connecting the playback head unit to the re-recording head unit includes step switch means operative to connect the magnetic heads in the playback head unit individually in succession to corresponding individual magnetic heads in the re-recording head unit upon successive drum rotations.

12. The apparatus of claim 10, wherein one of said magnetic head units comprises a plurality of magnetic heads individually contiguous to respective channels on the corresponding record tape and a housing supporting said magnetic heads with their respective gaps in alignment transversely across the record tape, the other of said magnetic head units comprises a single channel magnetic head mounted to be indexed from one channel to the next across the corresponding record tape upon successive rotations of the drum, and said means for connecting the playback head unit to the re-recording head unit includes switch means for connecting said single magnetic head in succession to individual ones of said plurality of magnetic heads upon successive rotations of the drum.

13. In a multichannel magnetic reproducing apparatus, the combination of a rotary shaft, a drum having a cylindrical periphery mounted on said shaft to rotate therewith, a multichannel magnetic original record tape extending lengthwise around the periphery of the drum, a multichannel magnetic playback head unit including a plurality of magnetic heads contiguous to the respective signal channels on the original record tape and a housing supporting said heads with their respective playback gaps in alignment transversely across the original record tape, a multichannel magnetic transfer record tape extending lengthwise around the periphery of the drum in spaced relation from the original record tape, a multichannel magnetic re-recording head unit including a plurality of magnetic heads contiguous to the respective channels on the transfer record tape and a housing supporting said last-mentioned heads with their respective recording gaps in alignment transversely across the transfer record tape, means for connecting the heads of the playback head unit individually in succession to corresponding heads of the re-recording unit upon successive rotations of the drum to re-record the original record signals individually in succession on the respective channels of the transfer record tape, and a support carrying one of said magnetic head units mounted on the drum shaft for adjustment angularly about said shaft for the selective displacement of said last-mentioned magnetic head unit along the drum periphery during the sequence of drum rotations to alter the time relationship among the several signals as they are re-recorded individually in succession on the respective channels of the transfer record tape.

14. In a multichannel magnetic reproducing apparatus, the combination of a movable record support, a multichannel original magnetic record medium on the record support extending lengthwise in the direction of movement of the record support, a magnetic playback head unit contiguous to the original magnetic record medium, means for moving said record support to advance said original record medium past the playback head unit repeatedly, means supporting said playback head unit to reproduce the signals from the respective channels on the original record medium upon repeated movements of the record support past the playback head unit, a second multichannel record medium on the record support extending lengthwise in the direction of movement of the record support, a recorder extending contiguous to said second record medium, means supporting said recorder to record successively at the different channels on said second record medium as the record support moves said second record medium repeatedly past said recorder, means for electrically connecting said playback head unit to said recorder to re-record individually in succession on the respective channels of said second record medium the signals from said original magnetic record medium upon repeated movements of the record support past the playback head unit and said recorder, and means for selectively effecting relative displacement between the playback head unit and said recorder along the record support in the direction of the latter's movement during the sequence of repeated movements of the record support to change the time relationship among the several signals as they are re-recorded individually in succession on the respective channels of the second record medium.

15. The apparatus of claim 14, further characterized by said movable record support being a rotary drum and by said magnetic playback head unit being an integral multichannel magnetic playback head presenting a plurality of individual magnetic heads contiguous respectively to individual signal channels on the magnetic record and having their respective playback gaps in alignment transversely across the magnetic record; and further characterized by said recorder being a single channel recorder and said means supporting said recorder including means for indexing said single channel recorder from one channel to the next on said second record medium upon successive rotation of said drum.

16. In a multichannel reproducing apparatus, the combination of a rotary drum having a cylindrical periphery, a multichannel magnetic record tape on the drum extending lengthwise around the drum periphery and having a length substantially less than that of the drum periphery, a magnetic playback head unit contiguous to the magnetic record tape on the drum and supported to reproduce the signals from the respective channels on the magnetic record tape upon successive rotations of the drum past the playback head unit, a second multichannel record medium on the drum extending lengthwise around the drum periphery and having a length substantially less than that of the drum periphery, a recorder contiguous to said second record medium on the drum and supported to re-record signals on said second record medium upon successive rotations of the drum past said recorder, means for electrically connecting the playback head unit to the recorder for re-recording the magnetic record signals individually in succession on the respective channels of said second record medium upon successive rotations of the drum, and means for effecting relative displacement between the playback head unit and said recorder along the drum periphery following the movement of both the magnetic record tape and said second record medium past the playback head unit and said recorder, respectively, during each successive drum rotation.

17. In a multichannel reproducing apparatus, the combination of a rotary drum having a cylindrical periphery, a multichannel original magnetic record tape on the drum extending lengthwise around the drum periphery and having a length substantially less than that of the drum periphery, an integral multichannel magnetic playback head unit presenting a plurality of individual magnetic heads contiguous respectively to individual signal channels on the original record tape and having their respective playback gaps in alignment transversely across the original record tape, a multichannel magnetic transfer record tape on the drum extending lengthwise around the drum periphery and having a length substantially less than that of the drum periphery, an integral multichannel magnetic re-recording head unit presenting a plurality of individual magnetic heads contiguous respectively to individual signal channels on the transfer record tape and having their respective playback gaps in alignment transversely across the transfer record tape, means for electrically connecting individual heads in the playback head unit to corresponding individual heads in the re-recording head unit for re-recording the original record signals individually in succession on the respective individual channels of the transfer record tape upon successive rotations of the drum, and means for selectively displacing one of said magnetic head units along the drum periphery following the movement of both record tapes past the respective magnetic head units during each successive drum rotation.

18. In combination, an integral magnetic playback head unit, a first multichannel magnetic record medium mounted for movement repeatedly past said playback head unit, said playback head unit being supported in playback relation to said magnetic record medium to reproduce the signals from the respective channels on said magnetic record medium upon successive movements of said magnetic record medium past said playback head unit, a recorder, a second multichannel record medium mounted for movement repeatedly past said recorder in unison with the successive movements of said first magnetic record medium past said playback head unit, means supporting the recorder in recording relation to said second record medium to record signals on the respective channels of said second record medium upon successive movements of said second record medium past the recorder, means for connecting the playback head unit to the recorder for re-recording the signals from said magnetic record medium individually in succession on respective individual channels of said second record medium during successive movements of said first magnetic record medium and said second record medium past the magnetic playback head unit and the recorder, respectively, and means for effecting relative displacement between the magnetic playback head unit and the recorder in the direction of movement of the respective record media during the sequence of repeated movements of the record media to change the time relationship among the several signals as they are re-recorded individually in succession on the respective channels of the second record medium.

19. In a multichannel magnetic reproducing apparatus, the combination of an integral magnetic playback head unit, a multichannel original magnetic record medium mounted for movement repeatedly past said playback head unit, means supporting said playback head unit in playback relation to said original record medium to reproduce the signals from the respective channels on the original record medium upon successive movements of the original record medium past said playback head unit, an integral magnetic re-recording head unit, a multichannel magnetic transfer record medium mounted for movement repeatedly past said re-recording head unit in unison with the successive movements of the original record medium past the playback head unit, means supporting the re-recording head unit in recording relation to the transfer record medium to record signals on the respective channels of the transfer record medium upon successive movements of the transfer record medium past the re-recording head unit, means for electrically connecting the playback head unit to the re-recording head unit for re-recording the signals from the original record medium individually in succession on respective individual channels of the transfer record medium during successive movements of said record media in unison past said head units, and means for selectively displacing one of said head units in the direction of movement of the corresponding record medium during the sequence of repeated movements of the record media to alter the time relationship among the several signals as they are re-recorded individually in succession on the respective channels of the transfer record medium.

References Cited in the file of this patent

UNITED STATES PATENTS

| | | |
|---|---|---|
| 2,416,445 | Jensen | Feb. 25, 1947 |
| 2,424,773 | Rieber | July 29, 1947 |
| 2,440,971 | Palmer | May 4, 1948 |
| 2,638,402 | Lee | May 12, 1953 |
| 2,658,579 | Rieber | Nov. 10, 1953 |
| 2,672,944 | Minton | Mar. 23, 1954 |
| 2,675,427 | Newby | Apr. 13, 1954 |
| 2,698,875 | Greenwood | Jan. 4, 1955 |
| 2,700,148 | McGuigan | Jan. 18, 1955 |

OTHER REFERENCES

Proc. of I.R.E., November 1953, pages 1578–1584.